United States Patent
Nallusamy et al.

(10) Patent No.: US 11,825,534 B2
(45) Date of Patent: *Nov. 21, 2023

(54) MULTICAST REPLICATION IN 5G NETWORKS

(71) Applicant: Juniper Networks, Inc., Sunnyvale, CA (US)

(72) Inventors: Loganathan Nallusamy, Bengaluru (IN); Venkatesh Padebettu, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,462

(22) Filed: Dec. 29, 2021

(65) Prior Publication Data

US 2022/0124847 A1 Apr. 21, 2022

Related U.S. Application Data

(63) Continuation of application No. 16/836,192, filed on Mar. 31, 2020, now Pat. No. 11,259,343.

(51) Int. Cl.
*H04W 76/12* (2018.01)
*H04W 4/06* (2009.01)
(Continued)

(52) U.S. Cl.
CPC ........... *H04W 76/12* (2018.02); *H04L 65/611* (2022.05); *H04W 4/06* (2013.01); *H04W 60/00* (2013.01)

(58) Field of Classification Search
CPC ............................. H04W 76/12; H04W 74/02
See application file for complete search history.

(56) References Cited

U.S. PATENT DOCUMENTS

2004/0213179 A1* 10/2004 Lundin ................. H04W 76/12
370/329
2008/0186962 A1 8/2008 Sinha
(Continued)

FOREIGN PATENT DOCUMENTS

CN 1402470 A 3/2003
CN 1452342 A 10/2003
(Continued)

OTHER PUBLICATIONS

Response to Extended Search Report dated Dec. 4, 2020, from counterpart European Application No. 20180087.7 filed Apr. 6, 2022, 20 pp.
(Continued)

*Primary Examiner* — Sulaiman Nooristany
(74) *Attorney, Agent, or Firm* — Shumaker & Sieffert, P.A.

(57) ABSTRACT

An Access Gateway Function (AGF) node can receive requests to join a multicast stream from a computing device. If the request is the first request to join the multicast stream, the AGF can forward the request to the UPF node. The multicast stream is then received via a tunnel between the AGF node and UPF node that is associated with the computing device. The tunnel associated with the first computing device to request joining the multicast stream can be a primary tunnel for the multicast stream. Subsequent requests to join the same multicast stream can cause the AGF node add tunnels associated with the requesting computing devices as secondary tunnels. The multicast stream is received via the primary tunnel and replicated to computing devices associated with the secondary tunnels. A secondary tunnel may be promoted to a primary tunnel in response to a failure or disconnection of the primary tunnel.

20 Claims, 8 Drawing Sheets

(51) Int. Cl.
  *H04W 60/00*   (2009.01)
  *H04L 65/611*   (2022.01)

(56) References Cited

U.S. PATENT DOCUMENTS

| | | |
|---|---|---|
| 2013/0010790 A1 | 1/2013 | Shao |
| 2015/0146603 A1 | 5/2015 | Wu et al. |
| 2021/0307091 A1 | 9/2021 | Nallusamy et al. |

FOREIGN PATENT DOCUMENTS

| | | |
|---|---|---|
| CN | 101035057 A | 9/2007 |
| CN | 102571616 A | 7/2012 |

OTHER PUBLICATIONS

Extended Search Report from counterpart European Application No. 20180087.7, dated Dec. 4, 2020, 12 pp.

Holbrook et al., "Using Internet Group Management Protocol Version 3 (IGMPv3) and Multicast Listener Discovery Protocol Version 2 (MLDv2) for Source-Specific Multicast," Network Working Group; RFC 4604, Aug. 2006, 11 pp.

Prosecution History from U.S. Appl. No. 16/836,192, dated Jun. 17, 2021 through Jan. 19, 2022, 55 pp.

Rummler et al., "A Multicast Mechanism for UMTS," IEEE Wireless Communications: vol. 13(4), Aug. 2006, pp. 94-103.

First Office Action and Search Report, and translation thereof, from counterpart Chinese Application No. 202010543922.2 dated Oct. 21, 2022, 18 pp.

Rummler et al., "A Multicast Mechanism for UMTS", Wireless Communications, IEEE, Aug. 2006, pp. 94-103.

\* cited by examiner

MULTICAST REPLICATION IN 5G NETWORKS

This application is a continuation of U.S. application Ser. No. 16/836,192, filed Mar. 31, 2020, the entire content of which is herein incorporated by reference.

TECHNICAL FIELD

The disclosure relates to replicating multicast data in computer networks.

BACKGROUND

Multicasting is a technique where a source can provide a same data stream to multiple receivers. For example, a source may provide an audio and video data stream to a group of receivers. The receivers that wish to receive the same audio and video data stream join a multicast group. The source can transmit a single data stream to the multicast group which is then replicated within the network to each participating receiver that has joined the multicast group. The source does not need to know which receivers have joined the multicast group. Thus, a source providing a data stream to a multicast group need only provide a single copy of network packets of the data stream, which are then replicated within the network to each receiver that has joined the multicast group.

SUMMARY

In general, the disclosure describes techniques for optimizing the usage of network bandwidth for a 5G network by performing stream replication at an access gateway function (AGF) node to reduce the redundant traffic between the AGF node and a user plane function (UPF) node. Multicasting provides a mechanism for a source to transmit a single data stream that can be received by many different receivers. One issue that may occur with existing approaches is that the same multicast stream for the same multicast group may be replicated and transmitted via multiple tunnels between an AGF node and UPF node depending on the number of receiving gateways (RGs) that belong to the multicast group. There may be several thousands of RGs connecting to a UPF node via the same AGF node and this may result in over usage of the network bandwidth between the AGF node and UPF node. Also, the increasing use of multicast streams created for IPTV combined with 4K content can cause increased bandwidth requirements for multicast data streams. The increased bandwidth requirements can result in degraded performance due to inefficient handling of multicast data streams in existing systems.

The techniques disclosed herein include an AGF node that can receive requests to join a multicast stream from a computing device. The AGF can determine if the request is the first request to join the multicast stream. If the request is the first request to join the multicast stream, the AGF can forward the request to the UPF node. The multicast stream is then received via a tunnel associated with the computing device, where the tunnel is between the AGF node and the UPF node. The tunnel associated with the first computing device to request joining the multicast stream is indicated by the AGF node to be a primary tunnel. Subsequent requests to join the same multicast stream can cause the AGF node to add tunnels associated with the requesting computing devices as secondary tunnels. The multicast stream is received by the AGF node via the primary tunnel and replicated by the AGF node to computing devices associated with the secondary tunnels. The multicast stream is not transmitted through the secondary tunnels unless a given one of the secondary tunnels is promoted to a primary tunnel in response to a failure or disconnection of the previous primary tunnel.

The techniques disclosed herein can provide a technical advantage over previous systems by reducing the network bandwidth utilization between an AGF node and a UPF node. As a practical application of the techniques described in this disclosure, the AGF node can forward a single initial join request for a multicast stream to an upstream UPF node. Subsequent join requests are processed within the AGF node and not forwarded to the UPF node. The AGF node can replicate the streams to the requestors of the streams.

In one example, an AGF node method includes a first network interface configured to communicatively couple the AGF node to a User Plane Function (UPF) node via a first network, the UPF node communicatively coupled to a multicast source via a data network; a second network interface configured to communicatively couple the AGF node to an access network; one or more processors coupled to the first network interface and the second network interface; and a computer-readable medium coupled to the one or more processors and storing instructions that, when executed by the one or more processors, cause the AGF node to: establish a first tunnel between the AGF node and the UPF node in response to registration of a first computing device with the AGF node, the first tunnel associated with the first computing device, establish a second tunnel between the AGF node and the UPF node in response to registration of a second computing device with the AGF node, the second tunnel associated with the second computing device, receive, from the second computing device, a multicast join request for a first multicast stream provided by a multicast source, and in response to a determination that the first multicast stream is currently received via the first tunnel and forwarded to the first computing device, replicate the first multicast stream and transmit the replicated first multicast stream to the second computing device, wherein the first multicast stream is received by the AGF node from the UPF node via the first tunnel.

In another example, a method includes establishing, by one or more processors of an AGF node, a first tunnel between the AGF node and a UPF node in response to registering a first computing device with the AGF node, the first tunnel associated with the first computing device; establishing a second tunnel between the AGF node and the UPF node in response to registering a second computing device with the AGF node, the second tunnel associated with the second computing device; receiving, by the AGF node from the second computing device, a multicast join request for a first multicast stream; and in response to determining that the first multicast stream is being forwarded to the first computing device, replicating, at the AGF node, the first multicast stream and transmitting, by the AGF node, the replicated first multicast stream to the second computing device, wherein the first multicast stream is received by the AGF node from the UPF node via the first tunnel.

In another example, a computer-readable medium includes instructions for causing one or more programmable processors to: establish a first tunnel between the AGF node and the UPF node in response to registration of a first computing device with the AGF node, the first tunnel associated with the first computing device; establish a second tunnel between the AGF node and the UPF node in response to registration of a second computing device with the AGF node, the second tunnel associated with the second computing device; receive, from the second computing device, a multicast join request for a first multicast stream provided by a multicast source; and in response to a determination that the first multicast stream is currently received via the first tunnel and forwarded to the first computing device, replicate the first multicast stream and transmit the replicated first multicast stream to the second computing device, wherein the first multicast stream is received by the AGF node from the UPF node via the first tunnel.

The details of one or more examples are set forth in the accompanying drawings and the description below. Other features, objects, and advantages will be apparent from the description and drawings, and from the claims.

DETAILED DESCRIPTION

Figure 1:
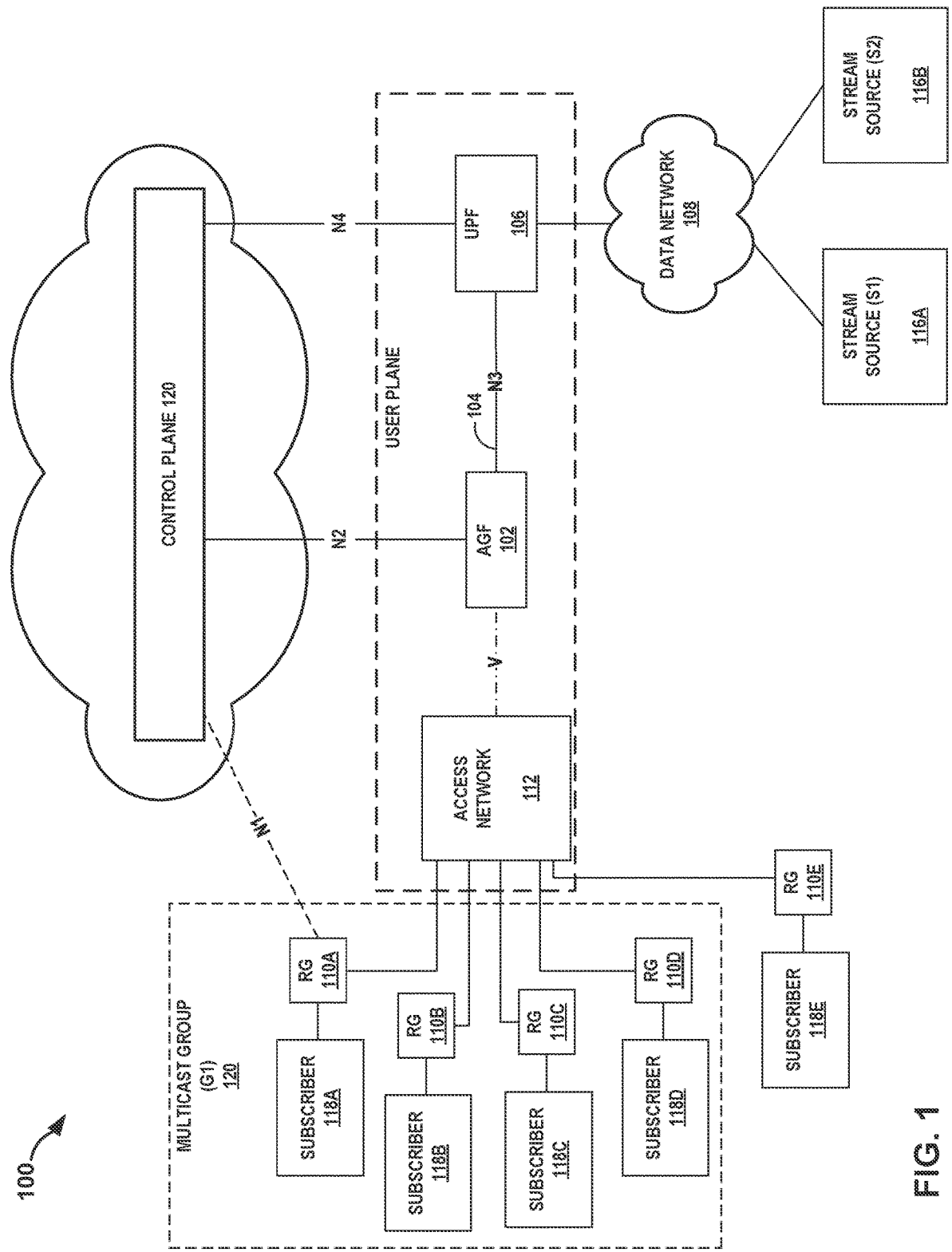
FIG. 1 is a block diagram illustrating an example system in which aspects of the disclosure may be implemented

FIG. 1 is a block diagram illustrating an example system 100 in which aspects of the disclosure may be implemented. In some aspects, system 100 includes stream sources 116A and 116B (generically referred to as a stream source 116), data network 108, user plane function (UPF) node 106, access gateway function (AGF) node 102, access network 112, control plane 120, and residential gateways (RG) 110.

Stream source 116 is a source of multicast streams, examples of which include video streams and audio streams. The multicast streams may be transmitted via data network 108 to UPF node 106. Data network 108 may be any type of network, including wide area networks, local area networks, intranets etc. In some aspects, data network 108 may be one or more of the networks that are part of the Internet.

UPF node 106 can provide an interconnection between downstream devices (e.g., AGF node 102, RGs 110 etc.) and data network 108. As such, UPF node 106 can provide packet routing and forwarding, policy enforcement, and data buffering services. In some aspects, UPF node 106 may be part of a 5G core network communicatively coupled to data network 108. UPF node 106 can receive multicast streams from data network 108 and forward the multicast streams to AGF node 102 via an interface 104 such as an N3 interface. The N3 interface can support General Packet Radio Service (GPRS) Tunnel Protocol (GTP).

AGF node 102 provides an interconnection between UPF node 106 and residential gateways 110. As such, AGF node 102 can provide an interface between a wired access network 112 and a 5G core network (via UPF node 106). An AFG node 102 can be considered as a wireline counterpart of an e-NodeB in wireless networks. In some aspects, AGF node 102 implements legacy wireline stacks thereby providing the ability for legacy user equipment to use legacy wireline access networks to access a data network via a 5G core. In some aspects, the interface between AGF node 102 and access network 112 can be a Virtual Local Area Network (VLAN) interface.

AGF node 102 can be subscriber aware. For example, AGF node 102 can be assigned to a UPF node to communicate with based on the subscriber identity and/or subscriber services. In some aspects, AGF node 102 receives a multicast stream from UPF node 106 and forwards the multicast stream to RGs 110 of subscribers 118 that have joined the multicast stream.

Residential gateway 110 can be any type of data communications device that interconnects a local network such as a home or office network of subscriber 118 to access network 112. Examples of a residential gateway 110 include a cable modem, DSL modem, wireless router, network switch, Voice over Internet Protocol (VoIP) analog telephone adapter, wireless access point, wired router etc. In some aspects, an RG 110 can be communicatively coupled to the AGF node 102 via access network 112.

Subscribers 118 may use computing devices communicatively coupled to a residential gateway 110 to join a multicast group 120. In the example illustrated in FIG. 1, multicast group 120 comprises the set of RGs 110 coupled to access network 112 where subscriber 118 devices have joined the same multicast stream provided by a stream source 116.

A multicast stream can be specified using a multicast source and group address that is unique to the multicast stream. In the discussion below, the tuple (Sn, Gn) identifies a particular multicast stream provided by a particular stream source 116, where Sn identifies the host source of the multicast stream and Gn identifies the multicast group for the multicast stream. For example, the tuple (S1, G1) identifies a first multicast stream (G1) being provided by stream source 116A (S1). Similarly, the tuple (S1, G2) would represent a second multicast stream provided by stream source 116A. A first multicast stream (G1) being provided by stream source 116B (S2) may be identified by the tuple (S2, G2). In the example illustrated in FIG. 1, multicast group 120 comprises RGs 110A-110D that have joined multicast group G1 to receive a multicast stream. RG 110E is not a member of multicast group 120 and does not receive the multicast stream.

Control plane 120 can be a 5G control plane that provides control and management functions for UPF node 106, AGF node 102, and optionally, RGs 110. In some aspects, the services provided by control plane 120 may include authentication services, access and mobility management services, and session management services. As shown in FIG. 1, control plane 120 may be a cloud based control plane that is physically separate from the user plane devices such as AGF node 102 and UPF node 106.

The example system shown in FIG. 1 is a simplified example having one UPF node 106 and one APF node 102. In general, a system can have many UPF nodes 106, and each UPF node 106 can communicate with multiple AGF nodes 102.

Figure 2:
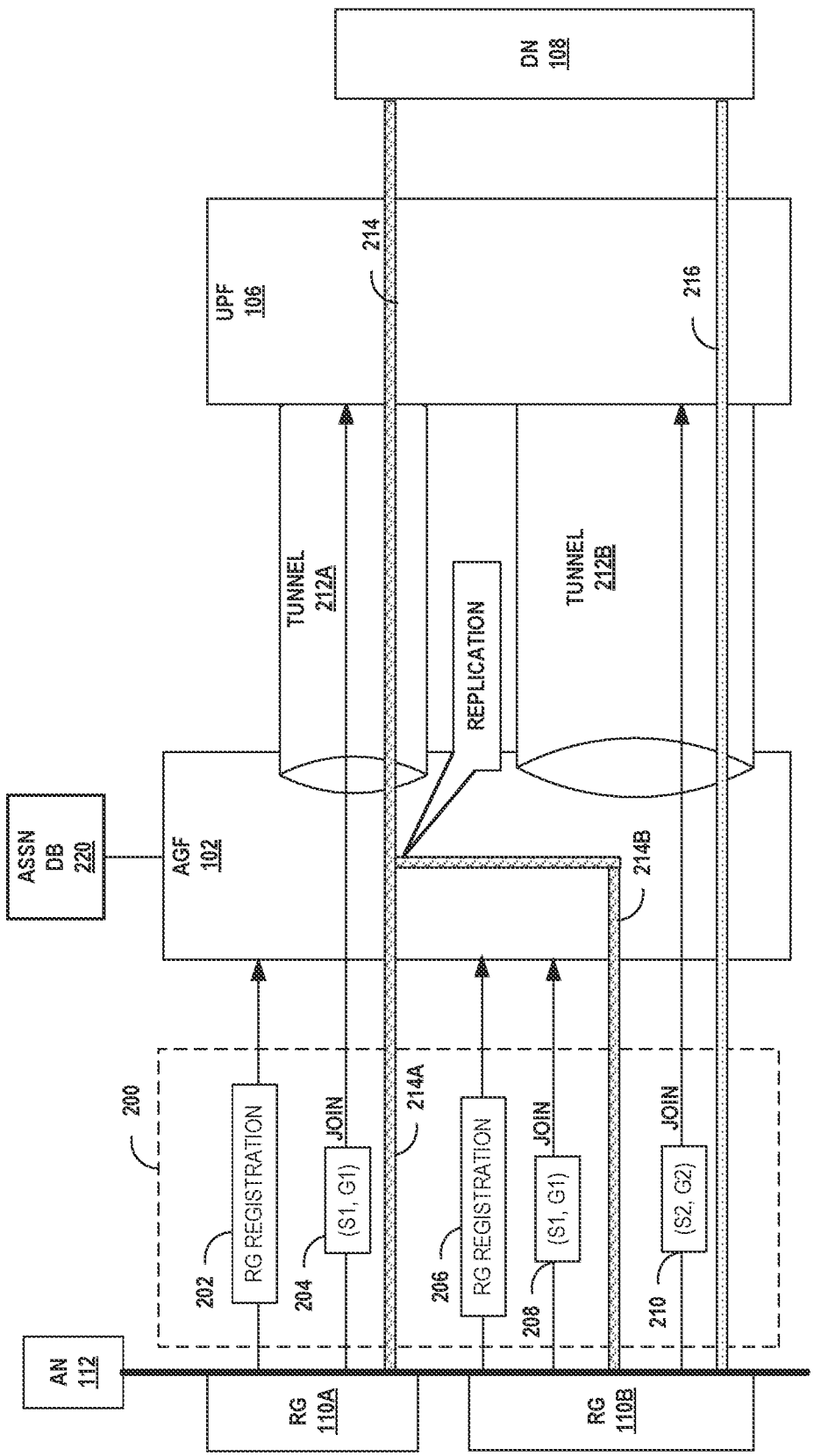
FIG. 2 is a block diagram illustrating an example registration sequence according to aspects of the disclosure.

FIG. 2 is a block diagram illustrating an example multicast stream join sequence 200 initiated by RG 1 110A and RG 2 110B according to aspects of the disclosure. In the example shown in FIG. 2, a first stream source S1 (not shown) provides multicast stream 214 (G1) via data network 108. A second stream source S2 (not shown) provides multicast stream 216 (G2) via data network 108. In order to establish a data communication session with data network 108, RG 1 110A registers with AGF node 102 by sending a registration request 202 to AGF node 102 via access network 112. In response to the registration request, AGF node 102 creates tunnel 212A between AGF node 102 and UPF node 106. Tunnel 212A is associated with RG 1 110A, and data flowing between RG 1 110A and data network 108 passes through tunnel 212A. In some aspects, AGF node 102 creates a tunnel between AGF node 102 and UPF node 106 for each subscriber device that registers with the AGF node 102. In some examples, the AGF node 102 creates a tunnel according to the GTP protocol.

In order to begin receiving multicast stream 214, RG 1 110A can issue an Internet Group Management Protocol (IGMP) "JOIN" message 204 (also referred to as a "Membership Report") specifying the multicast address (S1, G1). The IGMP JOIN message 204 indicates that RG 1 110A is to be registered as an interested listener for multicast stream 214. The IGMP JOIN message 204 is received from RG 1 110A by AGF node 102 via access network 112.

AGF node 102 receives the IGMP JOIN message 204. AGF node 102 can maintain an association database 220 (also referred to as a cache) that stores associations between multicast streams and tunnels receiving corresponding multicast streams. Upon receiving the IGMP JOIN message 204 for multicast stream 214, AGF node 102 can query association database 220 using the tuple (S1, G1) to determine if any tunnels are currently receiving multicast stream 214. For the purposes of the discussion herein, it is assumed that RG 1 110A is the first RG to subscribe to multicast stream 214. Thus, the query for tunnels already receiving multicast stream 214 will return no results. In response to determining that no tunnels are currently receiving multicast stream 214, AGF node 102 can create an entry in association database 220 associating multicast stream 214 with tunnel 212A associated with RG 1 110A:

<S1, G1>→Tunnel 212A

Additionally, AGF node 102 forwards the IGMP JOIN message 204 to UPF node 106 via the associated tunnel associated with RG 1 110A, i.e. Tunnel 212A. UPF node 106 in turn can forward the IGMP JOIN message 204 to control plane 120 for processing.

In order to establish a data communication session with data network 108, RG 2 110B also registers with AGF node 102 by sending a registration request 206 to AGF node 102 via access network 112. In response to the registration request, AGF node 102 creates tunnel 212B between AGF node 102 and UPF node 106. Tunnel 212B is associated with RG 2 110B, and data flowing between RG 2 110B and data network 108 passes through tunnel 212B. Thus, after registration, RG 1 110A can begin to receive multicast stream 214 from data network 108 via UPF node 106, tunnel 212A, AGF node 102, and access network 112.

RG 2 110B may join the same multicast group G1 from the same source address S1 that RG 1 110A previously joined. RG 2 110B can request multicast stream 214 by sending IGMP JOIN message 208 with the tuple (S1, G1) to AGF node 102. In response to receiving JOIN message 208, AGF node 102 queries association database 220 to determine if any tunnels are current receiving multicast stream 214. In the example illustrated in FIG. 2, AGF node 102 receives a query response that indicates that multicast stream 214 is currently flowing through tunnel 212A. In response to determining that multicast stream 214 is already being received via tunnel 212A, AGF node 102 begins replicating multicast stream 214 to RG 2 110B. In the example of FIG. 1, multicast stream 214 is received by AGF node 102 via tunnel 212A, and is forwarded to RG 1 110A as stream 214A, and replicated to RG 2 110B as stream 214 B. Thus, after registration, RG 2 110B receives multicast stream 214 from data network 108 via UPF node 106, tunnel 212A, AGF node 102, and access network 112.

IGMP join message 208 can be discarded by AGF node 102. As a result, in some aspects, UPF node 106 does not receive or process the IGMP join request. Thus, association database 220 can facilitate preventing AGF node 102 from forwarding future IGMP JOIN requests from other RGs that specify the same multicast stream (i.e., the multicast stream specified by the tuple (S1, G1)) when the multicast stream is already being received at AGF node 102.

In some aspects, AGF node 102 can update association database 220 to indicate that tunnel 212B is a secondary tunnel, i.e., tunnel 212B is available as a backup if the multicast stream 214 becomes unavailable via tunnel 212A. Thus, in some aspects, the association database 220 can include entries similar to the following:

<S1, G1>→Tunnel 212A, Tunnel 212B where Tunnel 1 can be a primary tunnel (e.g., tunnel 212A) on which the associated multicast stream 214 is received from UPF node 106 and Tunnel 2 (e.g., tunnel 212B) can be a secondary tunnel 212B that may be available for use should the primary tunnel 212A fail or otherwise become unavailable.

If AGF node 102 receives an IGMP JOIN request for the same multicast stream 214 associated with the tuple (S1, G1), the replication can continue and the association in the association database 220 may be extended as:

<S1, G1>→Tunnel 1, Tunnel 2, Tunnel 3, . . . Tunnel n.

where Tunnel 1 is tunnel 212A, Tunnel 2 is tunnel 212B, and tunnels 3-n are tunnels associated with RGs 110 that subsequently subscribe to multicast stream 214.

In the example illustrated in FIG. 2, RG 2 110B issues an IGMP JOIN request 210 to AGF node 102 to subscribe to a second multicast stream 216 having a multicast address specifying multicast group G2 from source S2 (e.g., (S2, G2)). AGF node 102 can query association database 220 to determine if any tunnels are currently associated with the tuple (S2, G2). In this example, RG 2 110B is the first RG to subscribe to multicast steam 216. AGF node 102 thus forwards IGMP JOIN request 208 to UPF node 106 via tunnel 212B. AGF node 102 begins receiving multicast stream 216 from UPF node 106 via tunnel 212B forwards multicast stream 216 data (e.g., data for S2, G2) to RG 2 110B.

Additionally, AGF node 102 can create a new entry in association database 220 indicating an association between (S2, G2) and tunnel 212B as:

<S2, G2>4 Tunnel 2.

Figure 3:
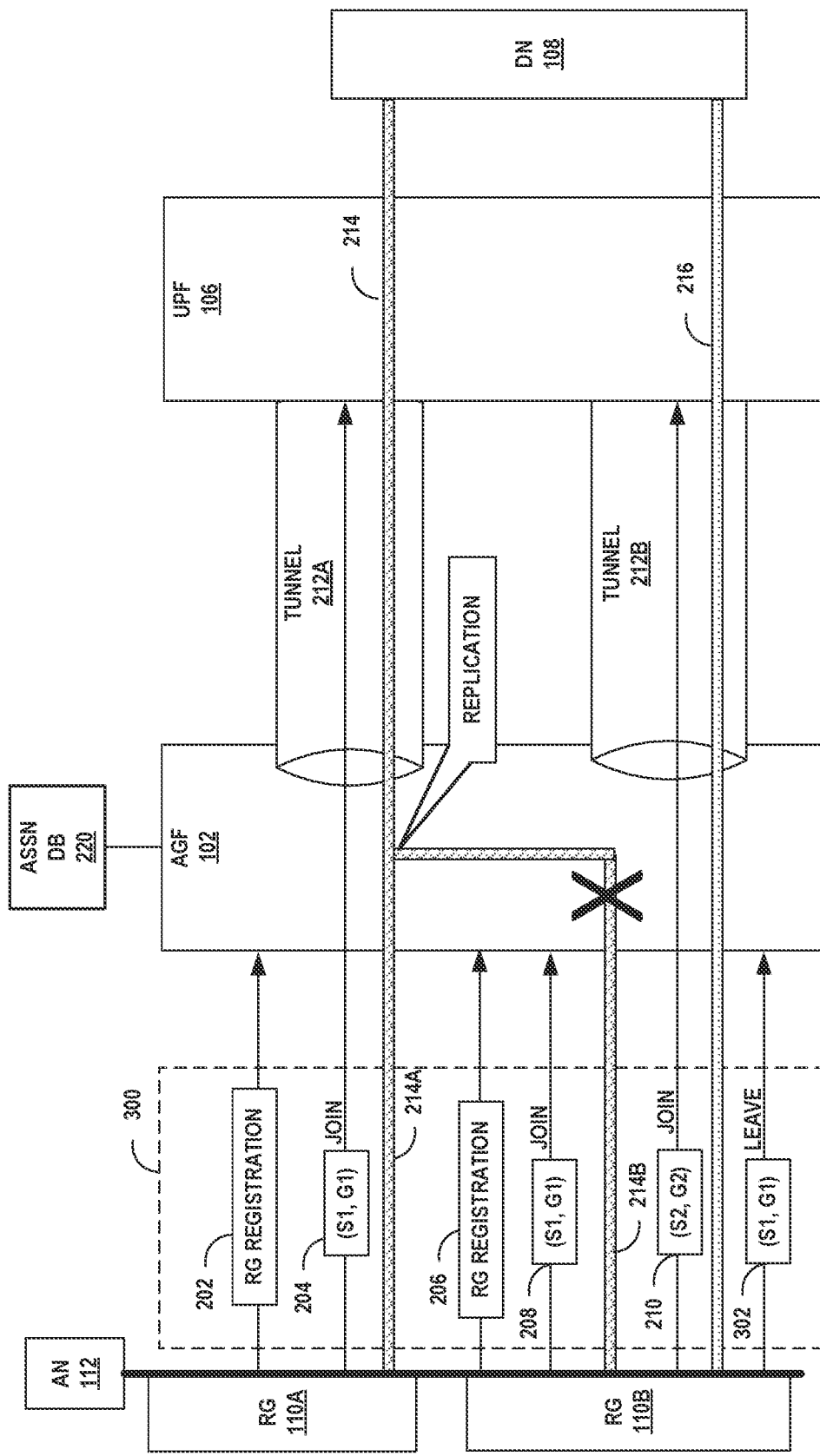
FIG. 3 is a block diagram illustrating an example multicast stream unsubscribe sequence according to aspects of the disclosure.

FIG. 3 is a block diagram illustrating an example multicast stream unsubscribe sequence according to aspects of the disclosure. The example sequence 300 illustrated in FIG. 3 continues the example shown in FIG. 2. In the example illustrated in FIG. 3, RG 2 110B unsubscribes to multicast stream 214 identified as multicast group G1 from source S1 by sending an IGMP LEAVE request 302 for multicast group (S1, G1) to AGF node 102. AGF node 102 can query association database 220 to determine the associations of (S1, G1), that indicate RGs that are currently receiving multicast stream 214. For instance, AGF node 102 can determine RGs that are currently receiving multicast 214 by querying association database 220 for tunnels of RGs 110 that are associated as primary or secondary tunnels with multicast stream 214. In the example illustrated in FIG. 3, the query can return a response that indicates that (S1, G1) identifying multicast stream 214 is being received via tunnel 212A as the primary tunnel, with tunnel 212B as a secondary tunnel. Tunnel 212*b* is associated with RG 2 110B. AGF node 102 can stop replicating multicast stream 214B to RG 2 110B. Additionally, AGF node 102 can remove the association of tunnel 212B as a secondary tunnel. The updated association of (S1, G1) in association database can be as follows:

<S1, G1>→Tunnel 1.

As shown in FIG. 3, the IGMP LEAVE request 302 is not forwarded to UPF node 106 and the multicast stream 214 continues to be forwarded to RG 1 110A and is no longer streamed to RG 2 110B.

Continuing the example, AGF node 102 may subsequently receive an IGMP LEAVE request (not shown in FIG. 3) from RG 1 110A. AGF node 102 can determine that the associated tunnel 212A is the last association with multicast stream 214 identified by the tuple (S1, G1). In response to this determination, AGF node 102 can forward the IGMP LEAVE request specifying (S1, G1) to UPF node 106 to stop streaming the multicast stream 214 traffic from data network 108 via tunnel 212A. Thus, AGF node 102 stops forwarding the (S1, G1) multicast stream 214 to RG 1 110A.

Figure 4:
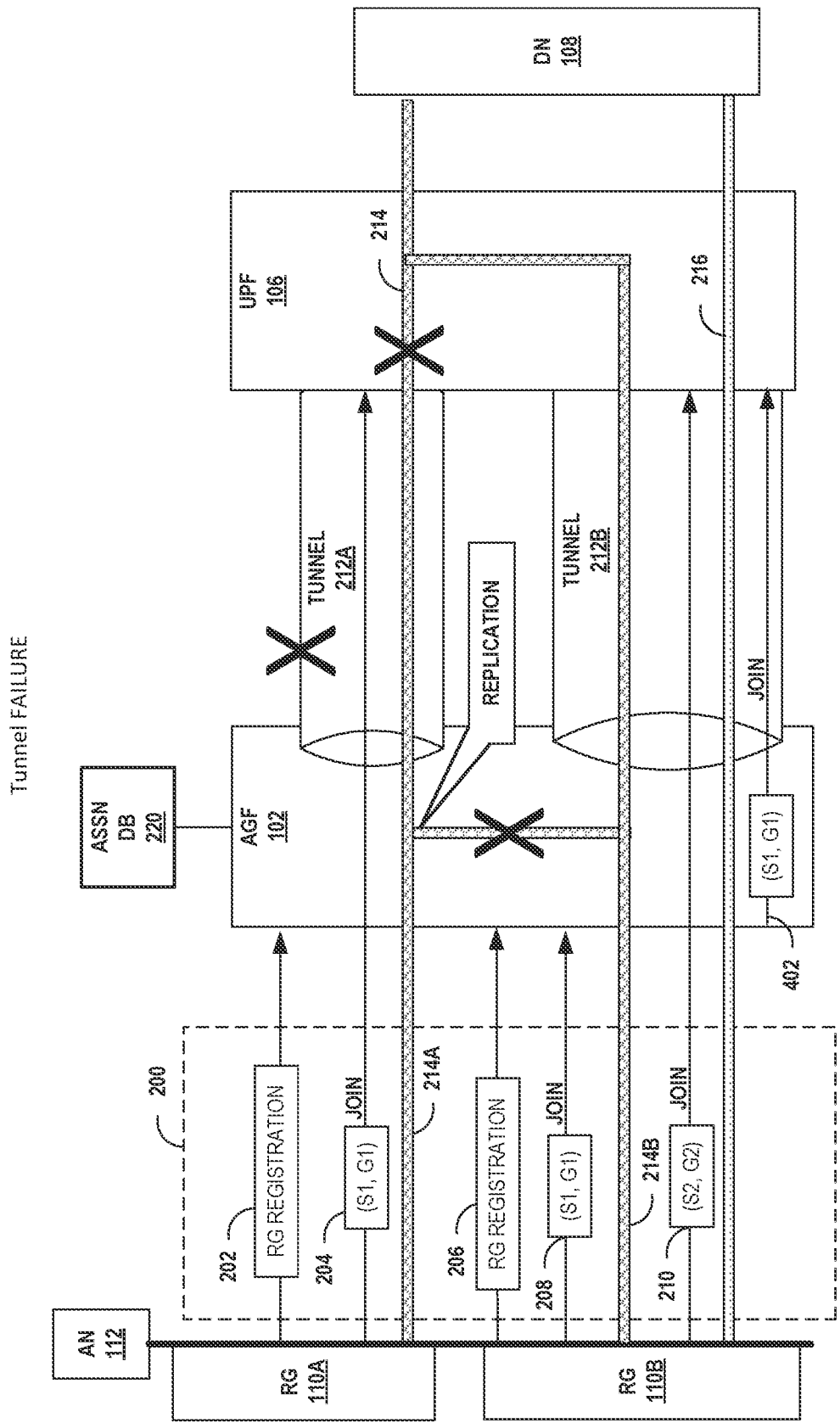
FIG. 4 is a block diagram illustrating an example multicast stream disconnect sequence according to aspects of the disclosure.

FIG. 4 is a block diagram illustrating an example multicast stream disconnect sequence according to aspects of the disclosure. FIG. 4, like FIG. 3, continues the example shown in FIG. 2. A multicast stream disconnect may occur as a result of a tunnel or node failure at any of multiple points (indicated by "X") along the path of multicast stream 214. For example, a tunnel failure can occur as a result of a connectivity loss to the UPF node 106, release of a protocol data unit (PDU) session released or loss of subscriber connectivity and cleanup due to keep-alive failure As discussed above with respect to FIG. 2, after RG 1 110A has joined the multicast group (S1, G1) to receive multicast stream 214 and RG 2 110B has joined multicast groups (S1, G1) to receive multicast stream 214 and (S2, G2) to receive multicast stream 216, the following associations can exist in association database 220:

<S1, G1>→Tunnel 212A, Tunnel 212B
<S2, G2>→Tunnel 212B

These associations indicate that tunnel 212A is a primary tunnel and tunnel 212B is a secondary association for multicast group (S1, G1), and that tunnel 212B is a primary tunnel for multicast group (S2, G2).

In response to AGF node 102 detecting a loss of connectivity associated with tunnel 212A, AGF node 102 can provide a seamless or nearly seamless multicast traffic replication from AGF node 102 to other sessions that stream multicast group (S1, G1) associated with multicast stream 214. In some aspects, AGF node 102 queries association database 220 to determine associations between multicast groups and the disconnected tunnel. As an example, should the primary tunnel 212A go down, AGF node 102 can determine, using association database 220, that tunnel 212A is a primary tunnel for multicast group (S1, G1). AGF node 102 determine, using association database 220, a secondary tunnel from the existing associations of multicast group (S1, G1). In this example, association database 220 indicates that tunnel 212B is the next associated tunnel. AGF node 102 can send an IGMP JOIN request specifying multicast group (S1, G1) to UPF node 106 via tunnel 212B. As a result, multicast stream 214 identified as multicast group (S1, G1) can start streaming via Tunnel 212B. The association database 220 can be updated accordingly:

<S1, G1>→Tunnel 212B
<S2, G2>→Tunnel 212B

The discussion of the examples illustrated in FIGS. 2-4 has used IGMP JOIN and IGMP LEAVE messages. Other protocols may provide multicast join and leave functionality. For example, Multicast Listener Discovery (MLD) can be used to manage multicast subscriptions instead of, or in addition to IGMP.

Figure 5:
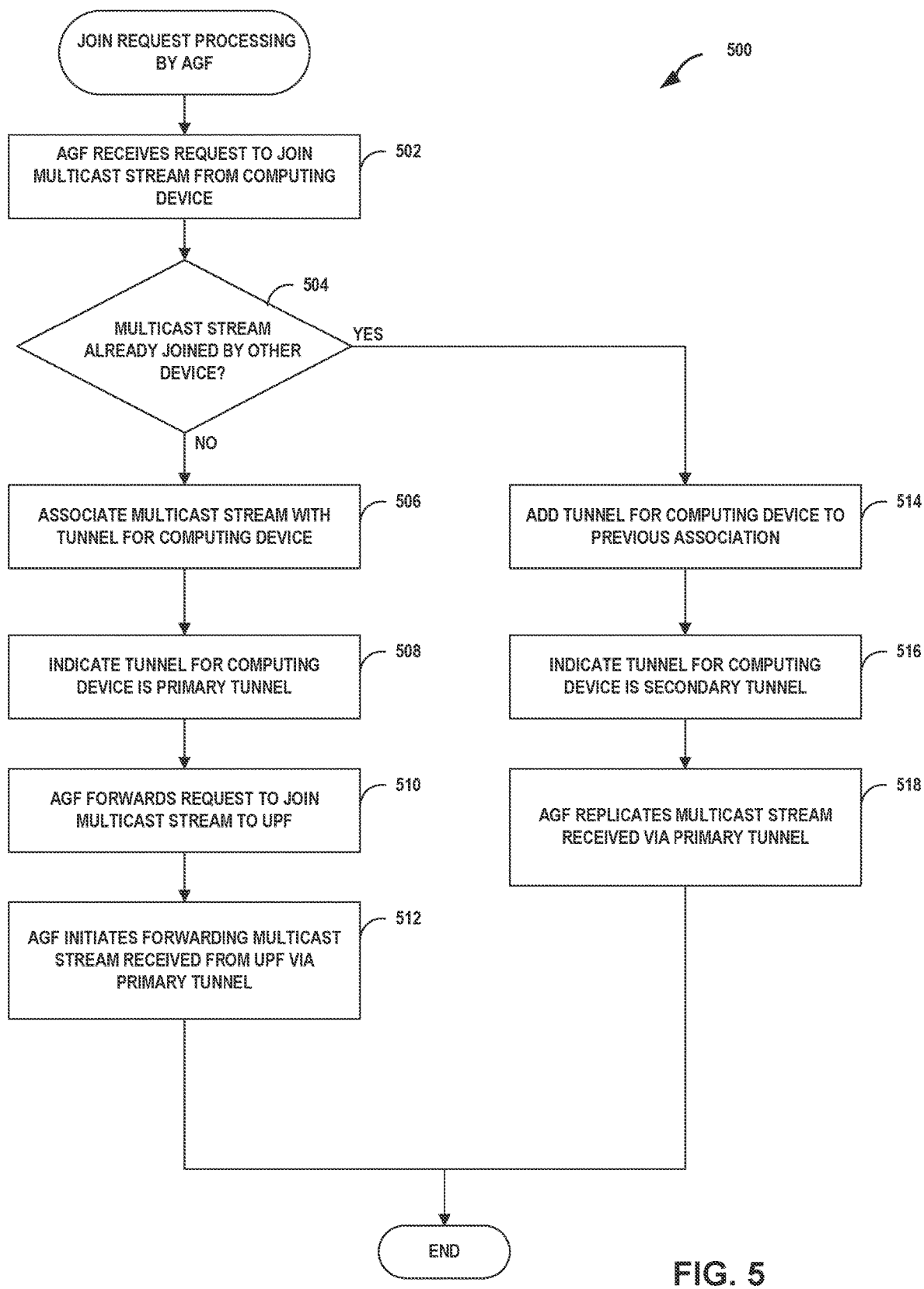
FIG. 5 is a flowchart illustrating example operations of a method for joining a multicast group according to aspects of the disclosure.

FIG. 5 is a flowchart 500 illustrating example operations of a method for joining a multicast group according to aspects of the disclosure. An AGF node can receive a request to subscribe to or join a multicast stream (502). In some aspects, the request can include a multicast group and multicast source identifier associated with the multicast stream that identifies a group for the multicast stream and a source that hosts the multicast stream. In some aspects, the request to join a multicast stream is provided in an IGMP JOIN message received from an RG via an access network 112.

The AGF node can determine if the requested stream has already been joined by another computing device such as an RG (504). As an example, the AGF node can query an association database or cache to determine if an association already exists for the specified multicast stream. In some aspects, the association may be indicated in the association database or cache by an association of the multicast group address (e.g., a group identifier and a source identifier) with an existing tunnel between the AGF node and a UPF node 106.

If there is no association for the multicast stream in the association database ("NO" branch of 504), the AGF node can create an association for the multicast stream in the association database or cache (506). In some aspects, the AGF node can create an association between the multicast address for the multicast stream (e.g., the group identifier and source identifier) and a tunnel identifier. The tunnel identifier can identify a tunnel between the AGF node and the UPF node that is created when the computing device registers with the AGF node to communicate to a data network. The tunnel is associated with the computing device during the registration process. The tunnel can be part of a network path that communicatively couples the computing device with the source of the multicast.

The AGF node can indicate that the tunnel is a primary tunnel for the requested multicast stream (508). In some aspects, an association of a multicast stream with one or more tunnels can be an association of the multicast address of the multicast stream with a list of tunnel identifiers. In other aspects, an association between a multicast stream and one or more tunnels receiving the multicast stream can be maintained using multiple entries with a key (e.g., the multicast group address) used to associate tunnel records with a multicast stream record. In such aspects, an indicator may be associated with the tunnel identifier indicating that the tunnel is a primary tunnel.

The AGF node forwards the multicast join request to a UPF node via the tunnel (510). The UPF node can forward the multicast join request to the host that is the source of the multicast stream via a data network coupled to the UPF node.

The AGF node initiates forwarding the multicast stream received via the primary tunnel to the computing device that issued the request to join the multicast stream (512).

If an association for the multicast stream already exists in the association database ("YES" branch of 504), the AGF node can add an association for the computing device issuing the request to the set of current associations (514). As discussed above, in some aspects, the associations of computing devices with a multicast stream may comprise a list of tunnel identifiers. The tunnel identifier associated with the computing device issuing the request can be added to the list of tunnels. The newly added tunnel can be added to the list subsequent to the primary tunnel in the list, thereby indicating that the newly added tunnel is a secondary tunnel (516).

The AGF node can initiate replication of the multicast stream received via the primary tunnel and forwarding of the replicated multicast stream to the computing device issuing the join request (518).

The AGF node can use the association database to determine how network data for a multicast stream is processed. For example, upon receipt of a network data packet of a multicast stream, the AGF node can query the association database to determine the associations that exist between the multicast stream and tunnels. The AGF node can forward the network data packet to each computing device having a tunnel associated with the multicast stream. Thus, the UPF node need only supply the multicast stream via a single tunnel, the primary tunnel. The AGF node can replicate the multicast stream received via the primary tunnel to those computing device on an access network that are indicated to have joined or subscribed to the multicast stream by virtue of having a tunnel for the computing device identified as a secondary tunnel for the multicast stream.

Figure 6:
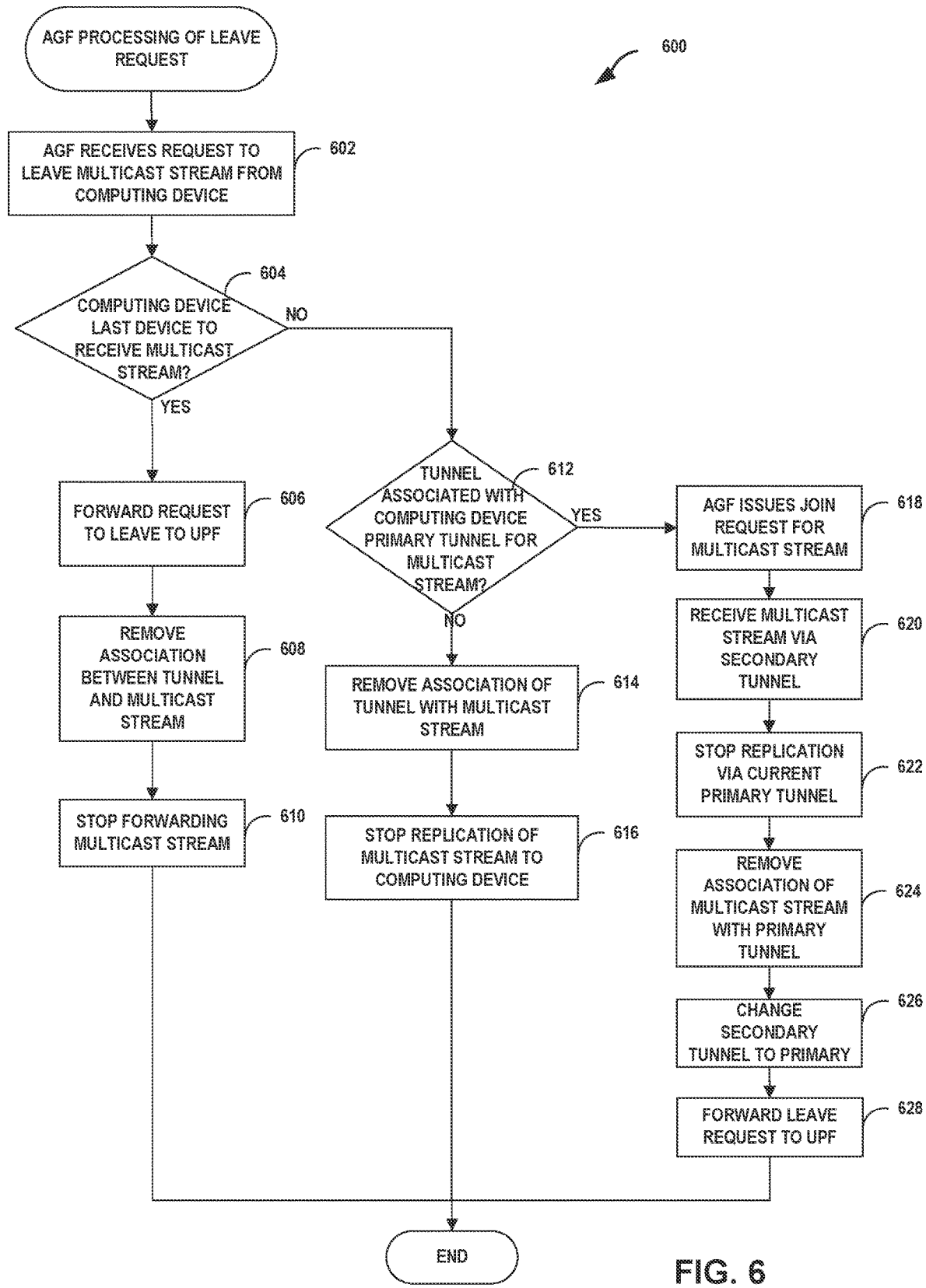
FIG. 6 is a flowchart illustrating example operations of a method for leaving a multicast group according to aspects of the disclosure.

FIG. 6 is a flowchart 600 illustrating example operations of a method for leaving a multicast group according to aspects of the disclosure. An AGF node can receive a request to leave or unsubscribe from a multicast stream (602). The AGF node can determine if the computing device is the last device receiving the multicast stream via the AGF node (604). For example, the AGF node may maintain an association database or cache and use the association database or cache to determine whether the computing device making the request is the last computing device receiving the multicast stream. As discussed above, the AGF node can maintain associations with a multicast stream using a list of tunnel identifiers of tunnels created when computing devices register with the AGF node to communicate to a data network via the APF node and a UPF node upstream from the computing device. If the tunnel identifier associated with the computing device making the leave request is the only tunnel identifier in the list, then the computing device is the last computing device receiving the multicast stream via the AGF node.

If the AGF node determines that the leave request is for the last device receiving the multicast stream via the AGF node ("YES" branch of 604), the AGF node can forward the request to leave the multicast stream to a UPF node providing the multicast stream (606). The UPF node can stop transmitting the multicast stream to the AGF node in response to receiving the request. The method then ends.

The AGF node can remove the last association for the multicast stream from the association database (608). For example, the AGF node can delete the association, or can remove the tunnel identifier associated with the computing device making the leave request from the list of tunnels, resulting in an empty list of tunnels. The AGF node can stop forwarding the multicast stream to the requesting computing device (610).

If the request to leave the multicast stream is not for the last remaining subscriber ("NO" branch of 604), the AGF node can determine if the request to leave the multicast stream is for the primary tunnel carrying the multicast stream (612). If the request is not for the primary tunnel ("NO" branch of 612), the AGF node can remove an association of the multicast stream with a secondary tunnel associated with the computing device making the request to leave the multicast stream (614). In some aspects, removing the association can be removing the tunnel identifier for the secondary tunnel from a set of tunnel identifiers associated with the multicast stream. For example, the AGF node can remove the tunnel identifier from a list of tunnel identifiers associated with the multicast stream or remove an entry associating the tunnel identifier with the multicast stream. The AGF node can stop replication and forwarding of the multicast stream to the computing device making the request to leave the multicast stream (616). The method then ends.

If the request to leave the multicast stream is for the primary tunnel ("YES") branch of 612), the AGF node can perform a "make before break" reassignment of the primary tunnel for the multicast stream. The AGF node can issue a request to join the multicast stream via a secondary tunnel currently associated with the multicast stream (618). The AGF node can select a secondary tunnel in various ways. In some aspects, the AGF node can select the next tunnel based on an order of tunnel identifiers in a list of tunnels associated with the multicast stream. In some aspects, the AGF node can select a tunnel having the lowest level network traffic. The AGF node begins to receive the multicast stream via the selected tunnel (620). The AGF node can forward the multicast stream received via the selected tunnel to computing devices that remain subscribed to the multicast stream and can stop replication of the multicast stream received via the current primary tunnel (622). The AGF node can remove the association of the multicast stream with the primary tunnel (624). For example, the AGF node can remove the tunnel identifier for the tunnel from a list of tunnels associated with the multicast stream or remove an entry for the current primary tunnel from the association database. The AGF node can change the current secondary tunnel now receiving the multicast stream to be the primary tunnel for the multicast stream (626). For example, the AGF node change the secondary tunnel to be the primary tunnel by placing the tunnel identifier for the tunnel at the head of a list of tunnels identifiers of tunnels associated with the multicast stream, or change an indicator in a record for the tunnel such that the tunnel is indicated in the association database to be the primary tunnel. The AGF node can then forward the request to leave the multicast stream to the UPF node to cause the UPF node to stop providing the multicast stream via the previous primary tunnel. The method then ends.

Figure 7:
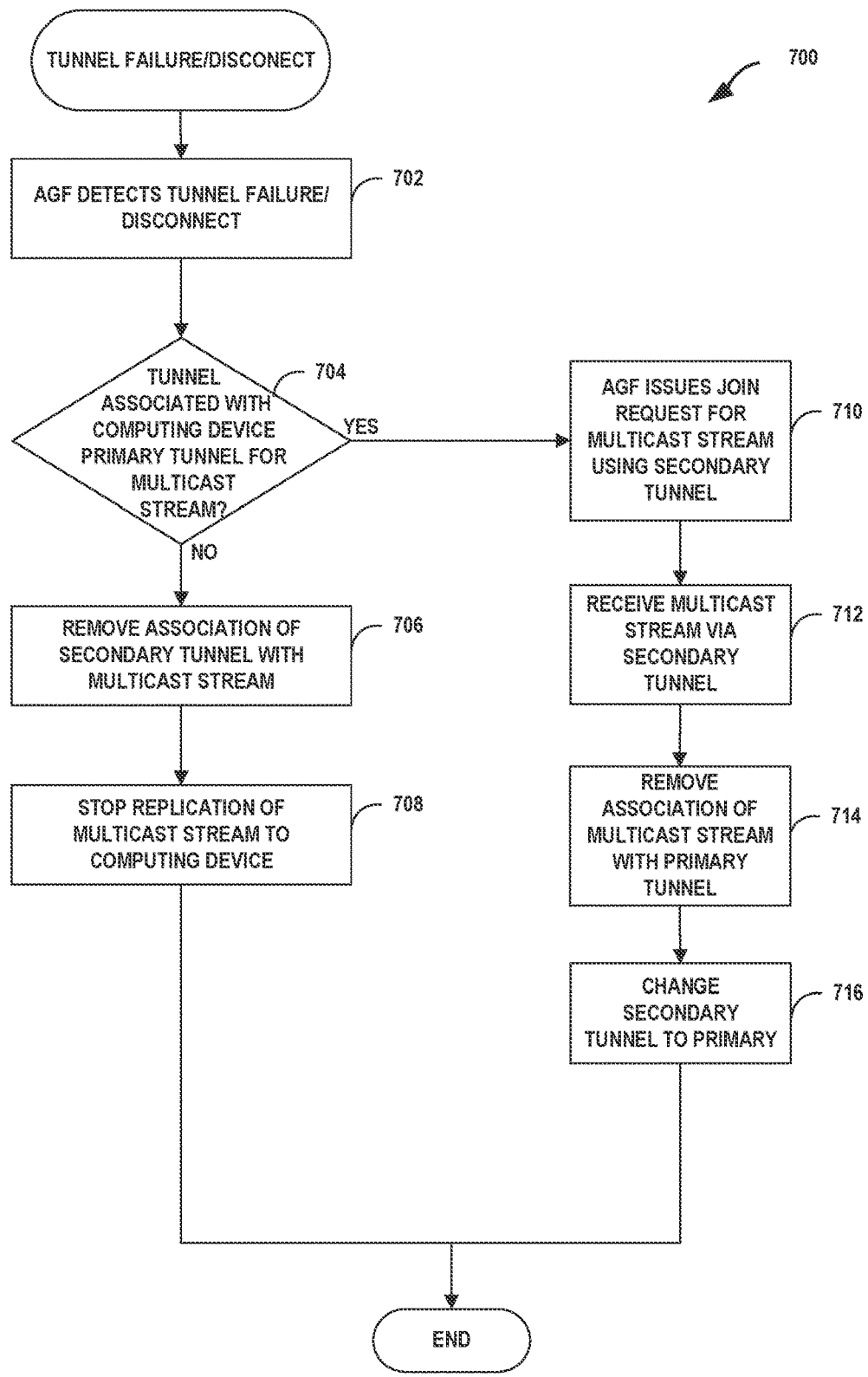
FIG. 7 is a flowchart illustrating example operations of a method for responding to a tunnel failure according to aspects of the disclosure.

FIG. 7 is a flowchart 700 illustrating example operations of a method for responding to a tunnel failure or disconnect according to aspects of the disclosure. An AGF may detect a failure or disconnect of a tunnel associated with a multicast stream (702). The disconnect may be for a primary tunnel that carries the network data for the multicast stream or a secondary tunnel that indicates the multicast stream is to be replicated but does not carry the network data for the multicast stream. As noted above, the AGF node may detect a tunnel failure may by detecting connectivity loss to the UPF node, PDU session release, subscriber connectivity loss and cleanup due to keep-alive failure.

The AGF node can determine if the failed or disconnected tunnel was the primary tunnel for the multicast stream (704). If the failed or disconnected tunnel was not for the primary tunnel, e.g., the failed or disconnected tunnel was a secondary tunnel for the multicast stream ("NO" branch of 704), the AGF node can remove the association of the secondary tunnel with the multicast stream using techniques described above with respect to FIG. 6 (706). The AGF node stops replicating the multicast stream received via the primary tunnel to the computing device associated with the failed or disconnected secondary tunnel (708).

If the failed or disconnected tunnel was the primary tunnel ("YES" branch of 704), the AGF node can issue a request to join the multicast stream via a secondary tunnel currently associated with the multicast stream (710). As noted above, the AGF node can select a secondary tunnel in various ways. In some aspects, the AGF node can select the next tunnel based on an order of tunnel identifiers in a list of tunnels associated with the multicast stream. In some aspects, the AGF node can select a tunnel having the lowest level network traffic. The AGF node begins to receive the multicast stream via the selected tunnel (712). The AGF node can forward the multicast stream received via the selected tunnel to computing devices that remain subscribed to the multicast stream and can stop replication of the multicast stream received via the current primary tunnel. The AGF node can remove the association of the multicast stream with the failed or disconnected primary tunnel (714). For example, the AGF node can remove the tunnel identifier for the tunnel from a list of tunnels associated with the multicast stream or remove an entry for the current primary tunnel from the association database. The AGF node can change the current secondary tunnel now receiving the multicast stream to be the primary tunnel for the multicast stream (716). For example, the AGF node change the secondary tunnel to be the primary tunnel by placing the tunnel identifier for the tunnel at the head of a list of tunnels identifiers of tunnels associated with the multicast stream, or change an indicator in a record for the tunnel such that the tunnel is indicated in the association database to be the primary tunnel. The method then ends.

Figure 8:
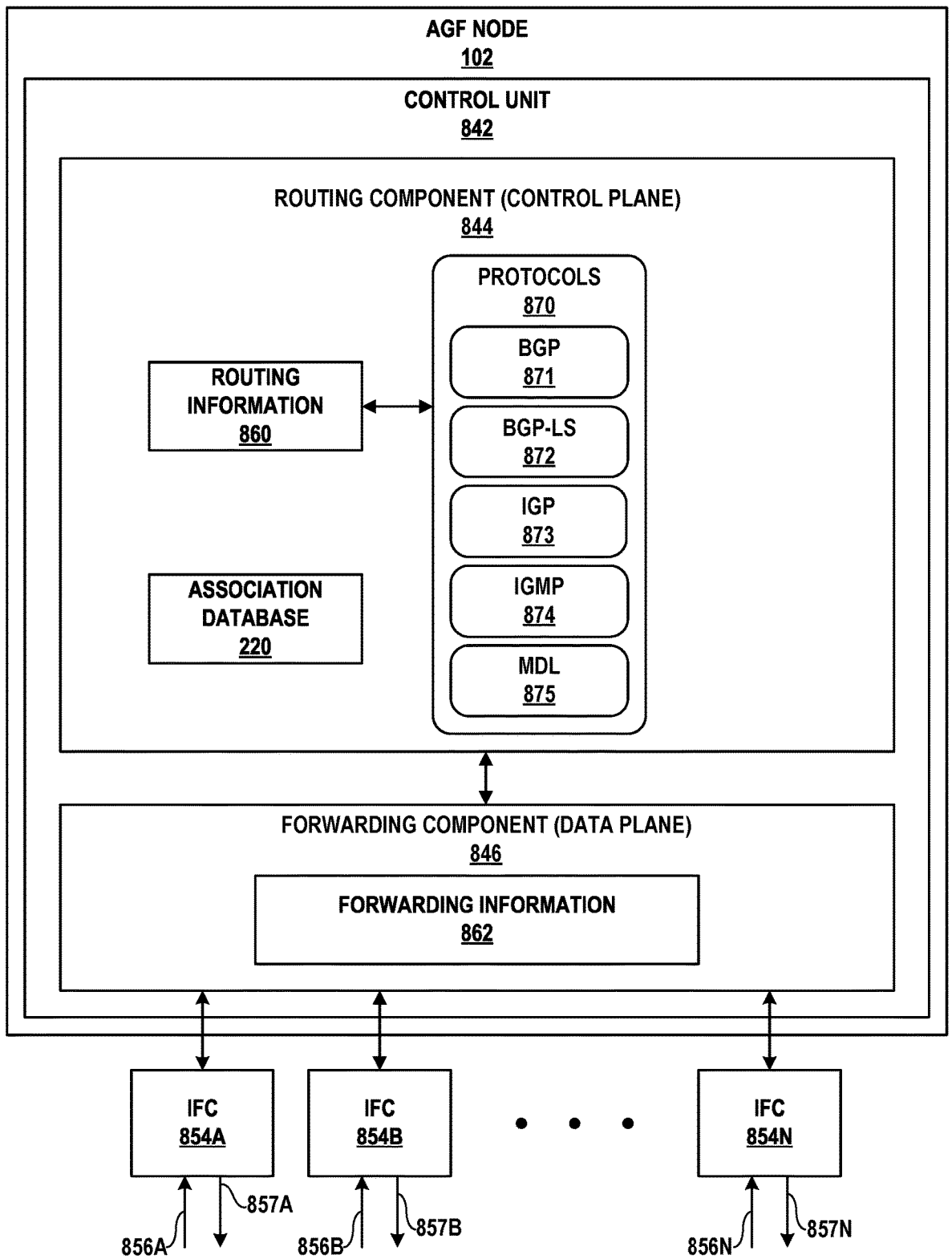
FIG. 8 is a block diagram illustrating an example AGF node configured to operate in accordance with the techniques of this disclosure.

FIG. 8 is a block diagram illustrating an example AGF node 102 configured to operate in accordance with the techniques described herein. While described with respect to AGF node 102, the techniques may be implemented by any other type of network device capable of providing an access gateway function. For example, the functionality provided by AGF node 102 may be integrated with a Digital Subscriber Line Access Multiplexer (DSLAM), Optical Line Terminal (OLT), Data Over Cable Service Interface Specification (DOCSIS) modem, or a device implementing any legacy access technology such as Asynchronous Transfer Mode (ATM). Thus, while described with respect to AGF node 102, the techniques should not be limited to an AGF node 102 described with respect to the example of FIG. 8.

In the example of FIG. 8, AGF node 102 includes interface cards 854A-854N ("IFCs 854") that receive and send data units, such as packet flows, via network links 856A-856N and 857A-857N, respectively. The packet flows may be associated with a multicast group address associated with a multicast stream. Network links 856A-856N and 857A-857N may communicatively couple AGF node 102 to access network 112 and N3 network 104. AGF node 102 may include a chassis (not shown) having a number of slots for receiving a set of cards, including IFCs 854. Each card may be inserted into a corresponding slot of the chassis for electrically coupling the card to routing component 844 via high-speed switch (not shown), which may comprise, for example, switch fabric, switchgear, a configurable network switch or hub, or other high-speed switching mechanisms. IFCs 854 may be coupled to network links 856A-856N and 857A-857N via a number of physical interface ports (not shown). Generally, IFCs 854 may each represent one or more network interfaces by which AGF node 102 may interface with links of a network.

In general, AGF node 102 may include a control unit 842 that determines routes of received packets and forwards the packets accordingly via IFCs 854. In the example of FIG. 8, control unit 842 includes routing component (control plane) 844 that configures and controls packet forwarding operations applied by forwarding component (data plane) 846.

Routing component 844 provides an operating environment for various routing protocols 870 that execute at different layers of a network stack. Routing component 844 is responsible for the maintenance of routing information 860 to reflect the current topology of a network and other network entities to which AGF node 102 is connected. In particular, routing protocols periodically update routing information 860 to accurately reflect the topology of the network and other entities based on routing protocol messages received by AGF node 102. The protocols may be software processes executing on one or more processors. For example, routing component 844 includes network protocols that operate at a network layer of the network stack, which are typically implemented as executable software instructions.

In the example of FIG. 8, protocols 870 may include Border Gateway Protocol (BGP) 871 to exchange routing and reachability information among routing domains in a network and BGP-LS 872 to exchange traffic engineering and segment routing policy information among routing domains in the network.

Protocols 870 may also include IGP 873 to exchange link state information and facilitate forwarding of packets or other data units between routers within each of the routing domains. In some examples, IGP 873 may include an OSPF routing protocol. In some examples, IGP 873 may include an IS-IS routing protocol. In some examples, AGF node 102 may include both an OSPF component and an IS-IS component.

As shown in FIG. 8, protocols 870 can include multiple different protocols and are provided as examples of the types of protocols that may be implemented by AGF node 102. However, an AGF node 102 need not implement all or any of the protocols shown in FIG. 8 and may implement protocols now known or developed in the future that are not shown in FIG. 8.

Protocols 870 may also include IGMP 874 and/or MDL protocol 875. In particular, protocols 870 may implement "JOIN" and "LEAVE" protocols of IGMP and/or MDL in accordance with RFC 4604 by H. Holbrook, entitled "Using Internet Group Management Protocol Version 3 (IGMPv3) and Multicast Listener Discovery Protocol Version 2 (MLDv2) for Source-Specific Multicast," dated August 2006.

By executing the routing protocols, routing component 844 identifies existing routes through the network and determines new routes through the network. Routing component 844 stores routing information 860 that includes, for example, known routes through the network. Forwarding component 846 stores forwarding information 862 that includes destinations of output links 857. Forwarding information 862 may be generated in accordance with routing information 860.

As discussed above, AGF node 102 maintains association database 120. AGF node 102 can use the association database 120 as described above to support packet forwarding performed by forwarding component 846.

Although described for purposes of example with respect to a router, AGF node 102 may be more generally a network device having access gateway functionality and need not necessarily be a dedicated AGF node. The architecture of AGF node 102 illustrated in FIG. 8 is shown for example purposes only. The techniques of this disclosure are not limited to this architecture. In other examples, AGF node 102 may be configured in a variety of ways. In one example, some of the functionally of control unit 842 may be distributed within IFCs 854. In another example, control unit 842 may comprise a plurality of packet forwarding engines operated as slave routers.

Control unit 842 may be implemented solely in software, or hardware, or may be implemented as a combination of software, hardware, or firmware. For example, control unit 842 may include one or more processors that execute program code in the form of software instructions. In that case, the various software components/modules of control unit 842 may comprise executable instructions stored on a computer-readable storage medium, such as computer memory or hard disk.

The techniques described in this disclosure may be implemented, at least in part, in hardware, software, firmware or any combination thereof. For example, various aspects of the described techniques may be implemented within one or more programmable processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

The invention claimed is:

1. A network device operating as an access gateway function (AGF) node of a 5G network, the network device comprising:
   a first network interface configured to communicatively couple the AGF node to a User Plane Function (UPF) node of the 5G network, the UPF node communicatively coupled to a multicast stream source;
   a second network interface configured to communicatively couple the AGF node to a plurality of computing devices; and
   one or more processors coupled to the first network interface and the second network interface, the one or more processors configured to cause the AGF node to:
      in response to receipt, from a first computing device, of a first multicast join request for a first multicast stream provided by the multicast stream source, forward the first multicast join request to the UPF node to initiate receiving the first multicast stream from the UPF node via a first tunnel associated with the first computing device,
      receive, from a second computing device, a second multicast join request for the first multicast stream provided by the multicast stream source, and
      in response to a determination that the first multicast stream is currently received via the first tunnel associated with the first computing device and forwarded to the first computing device, replicate the first multicast stream received via the first tunnel associated with the first computing device and transmit the replicated first multicast stream to the second computing device.

2. The network device of claim 1, wherein the AGF node does not forward the second multicast join request.

3. The network device of claim 1, wherein the one or more processors are further configured to cause the AGF node to:
   in response to receipt, from the first computing device, a multicast leave request for the first multicast stream,
      issue, by the AGF node, a third multicast join request for the first multicast stream to the UPF node,
      receive the first multicast stream via a second tunnel between the AGF node and the UPF node, the second tunnel associated with the second computing device,
      stop replication of the first multicast stream received via the first tunnel, and
      forward, by the AGF node, the multicast leave request to the multicast stream source via the UPF node.

4. The network device of claim 1, wherein the one or more processors are further configured to cause the AGF node to, in response to receipt, from the second computing device, of a multicast leave request for the first multicast stream, stop replication to the second computing device of the first multicast stream received via the first tunnel, wherein the AGF node does not forward the multicast leave request.

5. The network device of claim 1, wherein the one or more processors are further configured to cause the AGF node to, in response to detection of a failure of the first tunnel:
issue, by the AGF node, a third multicast join request for the first multicast stream to the UPF node;
receive the first multicast stream from the UPF node via a second tunnel associated with the second computing device; and
forward, by the AGF node, the first multicast stream to the second computing device.

6. The network device of claim 1, further comprising an association database maintaining associations between tunnels and multicast streams;
wherein the one or more processors are further configured to cause the AGF node to:
in response to a determination that there is no association of the first multicast stream with a tunnel, update the association database to indicate that the first tunnel is associated with the first multicast stream as a primary tunnel for the first multicast stream.

7. The network device of claim 6, wherein the one or more processors are further configured to cause the AGF node to:
in response to a determination that the association database indicates that the first tunnel is associated with the first multicast stream as the primary tunnel, add an indicator to the association database that a second tunnel is a secondary tunnel for the first multicast stream.

8. The network device of claim 1, further comprising an association database maintaining associations between tunnels and multicast streams received via the tunnels;
wherein the AGF node replicates the first multicast stream for one or more computing devices of the plurality of computing devices that are associated with one or more tunnels associated with the first multicast stream in the association database.

9. The network device of claim 1, wherein the AGF node is further configured to:
receive a multicast leave request for the first multicast; and
in response to a determination that a computing device issuing the multicast leave request is a last computing device to receive the first multicast stream via the AGF node, forward the multicast leave request for the first multicast stream to the UPF node.

10. A method comprising:
in response to receiving, by a network device operating as an Access Gateway Function (AGF) node of a 5G network and from a first computing device, a first multicast join request for a first multicast stream provided by a multicast stream source, forwarding the first multicast join request to a User Plane Function (UPF) node of the 5G network to initiate receiving the first multicast stream from the UPF node via a first tunnel associated with the first computing device;
receiving, by the AGF node from a second computing device, a second multicast join request for the first multicast stream; and
in response to determining that the first multicast stream is being forwarded to the first computing device via the first tunnel associated with the first computing device, replicating, at the AGF node, the first multicast stream received via the first tunnel associated with the first computing device and transmitting, by the AGF node, the replicated first multicast stream to the second computing device.

11. The method of claim 10, wherein the AGF node does not forward the second multicast join request.

12. The method of claim 10, further comprising:
in response to receiving, from the first computing device, a multicast leave request for the first multicast stream,
issuing, by the AGF node, a third multicast join request for the first multicast stream to the UPF node,
receiving the first multicast stream via a second tunnel associated with the second computing device,
stopping replication of the first multicast stream received via the first tunnel, and
forwarding, by the AGF node, the multicast leave request to the multicast stream source via the UPF node.

13. The method of claim 10, further comprising:
in response to receiving, from the second computing device, a multicast leave request for the first multicast stream, stopping replication to the second computing device of the first multicast stream received via the first tunnel, wherein the AGF node does not forward the multicast leave request.

14. The method of claim 10, further comprising: in response to detection of a failure of the first tunnel,
issuing, by the AGF node, a third multicast join request for the first multicast stream to the UPF node,
receiving the first multicast stream via a second tunnel associated with the second computing device, and
forwarding, by the AGF node, the first multicast stream to the second computing device.

15. The method of claim 10, further comprising:
in response to determining that there is no association of the first multicast stream with a tunnel in an association database maintaining associations between tunnels and multicast streams, updating the association database to indicate that the first tunnel is associated with the first multicast stream as a primary tunnel for the first multicast stream.

16. The method of claim 15, further comprising:
in response to determining that the association database indicates that the first tunnel is associated with the first multicast stream as a primary tunnel, add an indicator to the association database that a second tunnel is a secondary tunnel for the first multicast stream.

17. The method of claim 10, further comprising:
receiving a multicast leave request for the first multicast stream from a computing device; and
in response to determining that the computing device is a lasting computing device to receive the first multicast stream via the AGF node, forwarding the multicast leave request for the first multicast stream to the UPF node.

18. A non-transitory computer-readable medium comprising instructions that when executed cause one or more programmable processors of a network device operating as an access gateway function (AGF) node of a 5G network to:
in response to receipt, from a first computing device, of a first multicast join request for a first multicast stream provided by a multicast stream source, forward the first multicast join request to a User Plane Function (UPF) node of the 5G network to initiate receiving the first multicast stream from the UPF node via a first tunnel associated with the first computing device;
receive, from a second computing device, a multicast join request for the first multicast stream provided by the multicast stream source; and
in response to a determination that the first multicast stream is currently received via the first tunnel associated with the first computing device and forwarded to the first computing device, replicate the first multicast stream received via the first tunnel associated with the first computing device and transmit the replicated first multicast stream to the second computing device.

19. The non-transitory computer-readable medium of claim 18, wherein the instructions do not include instructions to forward the second multicast join request.

20. The non-transitory computer-readable medium of claim 18, wherein the instructions cause the one or more programmable processors to:
   in response to receipt, from the first computing device, of a multicast leave request for the first multicast stream,
   issue, by the AGF node, a second multicast join request for the first multicast stream to the AGF node,
   receive the first multicast stream via a second tunnel associated with the second computing device,
   stop replication of the first multicast stream received via the first tunnel, and
   forward, by the AGF node, the multicast leave request to the multicast stream source via the UPF node.

* * * * *